US008300682B2

United States Patent
Fang

(10) Patent No.: US 8,300,682 B2
(45) Date of Patent: Oct. 30, 2012

(54) SIGNAL PROCESSING SYSTEM, FILTER DEVICE AND SIGNAL PROCESSING METHOD

(75) Inventor: Liming Fang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 618 days.

(21) Appl. No.: 12/479,979

(22) Filed: Jun. 8, 2009

(65) Prior Publication Data

US 2009/0245335 A1    Oct. 1, 2009

Related U.S. Application Data

(63) Continuation of application No. PCT/CN2007/071175, filed on Dec. 5, 2007.

(30) Foreign Application Priority Data

Dec. 7, 2006 (CN) .......................... 2006 1 0167106

(51) Int. Cl.
*H04B 3/46* (2006.01)
*H04B 1/38* (2006.01)
(52) U.S. Cl. ....................................... 375/224; 375/219
(58) Field of Classification Search .................. 375/222, 375/224, 219
See application file for complete search history.

(56) References Cited

U.S. PATENT DOCUMENTS

| 5,892,464 | A * | 4/1999 | St. John et al. ............... 714/786 |
| 7,689,637 | B1 | 3/2010 | Gornstein et al. |
| 2003/0137925 | A1 | 7/2003 | Zamir |
| 2003/0235201 | A1 * | 12/2003 | Kasper et al. .................. 370/412 |
| 2004/0086064 | A1 | 5/2004 | Van Acker et al. |
| 2004/0090927 | A1 | 5/2004 | Zimmerman et al. |
| 2004/0114678 | A1 | 6/2004 | Langberg et al. |
| 2004/0170230 | A1 * | 9/2004 | Zimmerman et al. ......... 375/285 |
| 2005/0013353 | A1 | 1/2005 | Alloin |
| 2005/0052988 | A1 | 3/2005 | Tsatsanis et al. |

(Continued)

FOREIGN PATENT DOCUMENTS

CN    1386323 A    12/2002

(Continued)

OTHER PUBLICATIONS

Written Opinion from the International Searching Authority in corresponding PCT Patent Application No. PCT/CN2007/071204 (Jan. 31, 2008).

(Continued)

Primary Examiner — David C. Payne
Assistant Examiner — Brian J Stevens
(74) Attorney, Agent, or Firm — Leydig, Voit & Mayer, Ltd.

(57) ABSTRACT

A multi-channel signal processing system includes a filter unit arranged at a signal transmitting end and a feedback unit arranged at a signal receiving end. The filter unit includes a signal synthesis unit and a filter, where the filter is adapted to filter crosstalk source signals of signals to be transmitted and perform subsequent filtering in accordance with received feedback information; the signal synthesis unit is adapted to receive the signals to be transmitted which are input and the crosstalk source signals filtered by the filter, and synthesize the signals to be transmitted and the crosstalk source signals; and the feedback unit is adapted to make a feedback to the filter in accordance with the received signals to be transmitted.

14 Claims, 8 Drawing Sheets

U.S. PATENT DOCUMENTS

| | | | |
|---|---|---|---|
| 2005/0074055 | A1 | 4/2005 | Takatori et al. |
| 2005/0099967 | A1* | 5/2005 | Baba .............................. 370/286 |
| 2006/0029147 | A1 | 2/2006 | Tsatsanis |
| 2006/0078065 | A1 | 4/2006 | Cai et al. |
| 2007/0014378 | A1 | 1/2007 | Parhi et al. |
| 2007/0273585 | A1 | 11/2007 | Sarroukh et al. |
| 2008/0188185 | A1 | 8/2008 | Shi |

FOREIGN PATENT DOCUMENTS

| | | | |
|---|---|---|---|
| CN | 1395779 | A | 2/2003 |
| CN | 1499734 | A | 5/2004 |
| CN | 1552132 | A | 12/2004 |
| CN | 1689072 | A1 | 10/2005 |
| CN | 1838578 | A | 9/2006 |
| CN | 1863099 | A | 11/2006 |
| CN | 1866938 | A | 11/2006 |
| CN | 1870458 | A | 11/2006 |
| CN | 101197593 | A | 6/2008 |
| CN | 101197798 | B | 11/2011 |
| EP | 2091193 | A1 | 8/2009 |
| EP | 2093896 | A1 | 8/2009 |
| WO | WO 03/017534 | A2 | 2/2003 |
| WO | WO 2004/017303 | A1 | 2/2004 |
| WO | WO 2004/105287 | A2 | 12/2004 |
| WO | WO 2005/076554 | A1 | 8/2005 |
| WO | WO 2005/106841 | A1 | 11/2005 |

OTHER PUBLICATIONS

International Search Report in corresponding PCT Patent Application No. PCT/CN2007/071204 (Jan. 31, 2008).

Written Opinion from the International Searching Authority in corresponding PCT Patent Application No. PCT/CN2007/071239 (Mar. 27, 2008).

International Search Report in corresponding PCT Patent Application No. PCT Patent Application No. PCT/CN2007/071239 (Mar. 27, 2008).

Written Opinion from the International Searching Authority in corresponding PCT Patent Application No. PCT/CN2007/071175 (Mar. 20, 2008).

International Search Report in corresponding PCT Patent Application No. PCT/CN2007/071175 (Mar. 20, 2008).

Corresponding U.S. Appl. No. 13/271,903, filed Oct. 13, 2011.

Corresponding U.S. Appl. No. 12/478,962, filed Sep. 14, 2011.

Corresponding U.S. Appl. No. 12/481,307, filed Sep. 14, 2011.

1st Office Action in corresponding Chinese Application No. 200610168031.3 (Jul. 12, 2010).

2nd Office Action in corresponding Chinese Application No. 200610168031.3 (Mar. 30, 2011).

1st Office Action in corresponding Chinese Application No. 200610164435.5 (Aug. 12, 2010).

2nd Office Action in corresponding Chinese Application No. 200610164435.5 (Feb. 25, 2011).

1st Office Action in corresponding Chinese Application No. 200610162179.6 (Jun. 10, 2010).

1st Office Action in corresponding Chinese Application No. 200610164436.X (Nov. 27, 2009).

Extended European Search Report in corresponding European Application No. 07846023.5 (Feb. 15, 2011).

Extended European Search Report from the European Patent Office in corresponding European Patent Application No. 07846070.6 (Apr. 9, 2010).

Communication in European Application No. 07846070.6-2411 (Apr. 9, 2010).

Li et al., "Noise Reduction Using a Variable Step Sizze Adaptive Filter," Optoelectronic Technology & Information, vol. 17, No. 5, Oct. 2004.

Gilloire, A., et al., "Adaptive Filtering in Subbands with Critical Samplong: Analysis, Experiments, and Application to Acoustic Echo Cancellation," Aug. 1992, IEEE Transaction of Signal Processing, New York, USA.

1st Information Disclosure Statement in corresponding U.S. Appl. No. 12/478,962, filed Jun. 5, 2009.

2nd Information Disclosure Statement in corresponding U.S. Appl. No. 12/478,962, filed Oct. 5, 2010.

3rd Information Disclosure Statement in corresponding U.S. Appl. No. 12/478,962, filed Nov. 19, 2010.

4th Information Disclosure Statement in corresponding U.S. Appl. No. 12/478,962, filed Apr. 6, 2011.

* cited by examiner

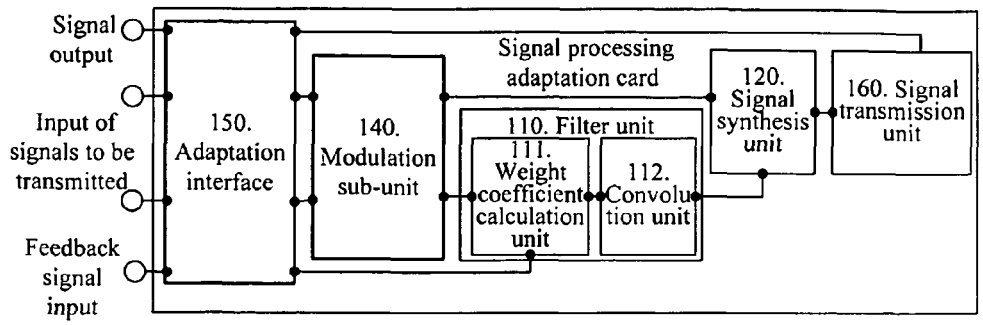

FIG. 11

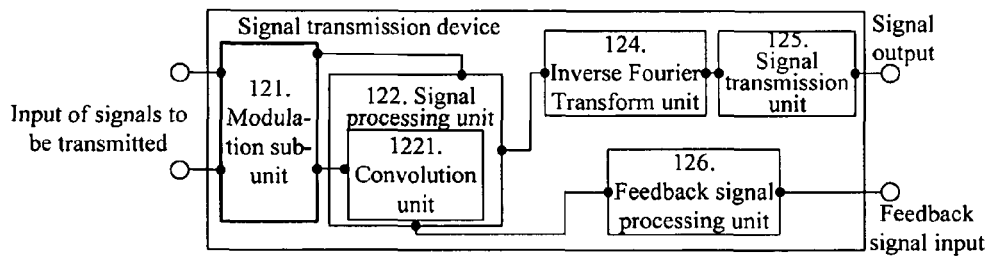

FIG. 12

131. prepare a signal processing chip and a transmission unit. The signal processing chip is adapted to filter crosstalk source signals of a branch of signals to be transmitted by use of filter weight coefficients, to synthesize the branch of signals to be transmitted and the filtered crosstalk source signals, to receive feedback signals of the signals to be transmitted at a receiving end, and to calculate new filter weight coefficients for the next filtering operation in accordance with the feedback information. The signal transmission unit is adapted to receive the signals synthesized by the signal synthesis unit and to transmit the signals

↓

132. connect an output of the signal processing chip to an input of the transmission unit

FIG. 13

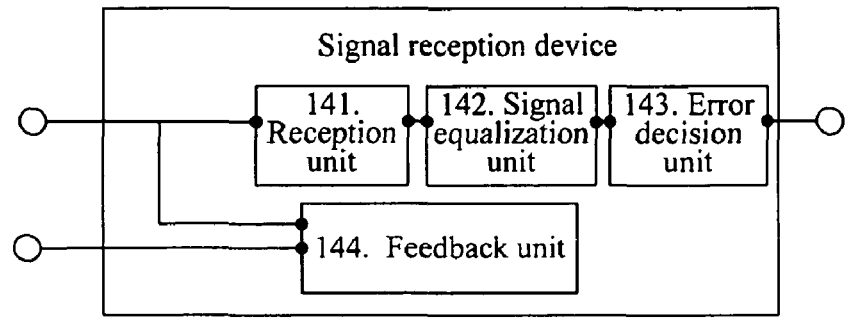

FIG. 14

| 151. filter at least one branch of crosstalk source signals with initial filter weight coefficients at a signal transmitting end |
|---|

| 152. synthesize a branch of signals to be transmitted and the filtered crosstalk source signals, and transmit the synthesized signals to a signal receiving end |
|---|

| 153. perform filtering process according to new filter weight coefficients, which are obtained from a feedback of the branch of signals to be transmitted and can reduce a signal error at the receiving end |
|---|

SIGNAL PROCESSING SYSTEM, FILTER DEVICE AND SIGNAL PROCESSING METHOD

CROSS-REFERENCE TO RELATED APPLICATIONS

This application is a continuation of International Patent Application No. PCT/CN2007/071175, filed Dec. 5, 2007, which claims priority to Chinese Patent Application No. 200610167106.6, filed Dec. 7, 2006, both of which are hereby incorporated by reference in their entirety.

FIELD OF THE INVENTION

The present invention relates to the information processing field, and in particular to a multi-channel signal processing system, a filter device, and a multi-channel signal processing method.

BACKGROUND OF THE INVENTION

All Digital Subscriber Line (DSL) techniques are collectively referred to as the xDSL, which is a technique for high speed data transmission over a telephone twisted pair. In addition to the base band transmission DSL based upon the Integrated Services Digital Network (ISDN) and the like, the pass band transmission xDSL makes use of the frequency division multiplexing technique to make the xDSL and the Plain Old Telephone Service (POTS) coexist on the same twisted pair, where the xDSL occupies the high frequency band and the POTS occupies the base band part below 4 KHz. A system providing multiple accesses for xDSL signals may be referred to as a DSL Access Multiplexer (DSLAM).

As a transmission channel, the telephone twisted pair has a distortion-free information capacity which shall satisfy the Shannon channel capacity formula. The transmission capacity of the channel can be increased appropriately if the noise energy is reduced. The crosstalk, especially the crosstalk at a high frequency band, is a technical issue causing noise and has become a serious obstacle to improving the channel transmission capacity in some scenarios.

FIG. 1 schematically illustrates a principle diagram of a crosstalk. Because the xDSL adopts frequency division multiplexing for uplink and downlink channels, a near-end crosstalk may not influence the system performance considerably but a far-end crosstalk may influence seriously the transmission performance of lines. In FIG. 1, x1, x2 and x3 denote signal transmitting points, y1, y2 and y3 denote corresponding far-end signal receiving points, solid line arrows denote normal signal transmission, and dotted line arrows denote a crosstalk caused by a signal transmitting point to the receiving points corresponding to other signal transmitting points. As apparent from FIG. 1, signals to be transmitted at the points x2 and x3 are crosstalk sources for signals to be transmitted at the point x1, and naturally signals to be transmitted at the point x1 are crosstalk sources for signals to be transmitted at the points x2 and x3. Therefore, for clarity, a branch of signals to be transmitted is described as a reference object while regarding other signals as their crosstalk sources hereinafter. Such descriptions can be adaptive to respective branches of signals. Distinguishing names used for signals are merely for convenience, but not intended to differentiate the signals substantively.

In order to address the problem of the degraded channel performance due to the far-end crosstalk, a method of coordinated signal processing was proposed in the industry to cancel a far-end crosstalk among respective branches of signals by use of the feature of coordinated transmission and reception at the DSLAM end. At present, the signals are processed with a fixed filter in the frequency domain based upon such a principle that crosstalk cancellation calculations are performed on the premise that a channel transmission matrix has been pre-known. For coordinated reception of signals, this method frequency domain filters respective frequency points of received signals in accordance with the pre-known channel transmission matrix, and then estimates input channel signals in a general decision feedback equalization method. The essence of the method lies in that: because the channel transmission matrix is known, the relationship between crosstalk components in the received signals and a crosstalk source may be deduced, so that received signals corresponding to the crosstalk source can be used to approximately simulate the crosstalk source, thereby implementing a crosstalk cancellation at the coordinated receiver. On the other hand, for coordinated transmission of signals, the method is similar to that for coordinated reception, except that the signals are pre-coded in the frequency domain before transmission instead of processing the signals undergoing a crosstalk, to pre-cancel a crosstalk which may occur. Therefore, the receiver receives the signals from which the crosstalk has been cancelled.

The above method has a disadvantage in that the channel transmission matrix has to be pre-known, but it may be difficult to obtain the matrix accurately and conveniently. Moreover, the matrix per se features slow time-variation and may be susceptible to a transmission environmental factor. Consequently, the above solution may be difficult to implement in practice. Therefore, it is necessary to provide more techniques for noise cancellation for use in various scenarios.

SUMMARY OF THE INVENTION

Embodiments of the invention are directed to providing a multi-channel signal processing system, a filter device, a signal processing chip, a signal processing adaptation card and a multi-channel signal processing method, so as to cancel the crosstalk between respective lines in a transmission channel.

Accordingly, an embodiment of the invention provides a multi-channel signal processing system including: (1) a filter unit arranged at a signal transmitting end and a feedback unit arranged at a signal receiving end, the filter unit comprising a signal synthesis unit and a filter, where (2) the filter is adapted to filter crosstalk source signals of signals to be transmitted and perform subsequent filtering in accordance with received feedback information; (3) the signal synthesis unit is adapted to receive the signals to be transmitted which are input and the crosstalk source signals filtered by the filter, and synthesize the signals to be transmitted and the crosstalk source signals; and (4) the feedback unit is adapted to make a feedback to the filter in accordance with the received signals to be transmitted.

An embodiment of the invention further provides a filter device including: (1) a filter, adapted to filter crosstalk source signals of signals to be transmitted by use of filter parameters updated in accordance with feedback information of the signals to be transmitted; and (2) a signal synthesis unit, adapted to receive the signals to be transmitted which are input and the crosstalk source signals filtered by the filter, and synthesize the signals to be transmitted and the filtered crosstalk source signals.

An embodiment of the invention further provides a multi-signal processing method including: (1) filtering at least crosstalk source signals of signals to be transmitted by use of initial filter weight coefficients at a signal transmitting end; (2) synthesizing the signals to be transmitted and the filtered crosstalk source signals, and transmitting the synthesized signals to a signal receiving end; and (3) filtering with new filter weight coefficients, which are obtained from a feedback of the signals to be transmitted and capable of reducing a signal error at the receiving end.

As apparent from the above technical solutions, the embodiments of the present invention have the following advantages. Crosstalk source signals are filtered before transmission of signals to simulate and generate far-end crosstalk signals of the signals, i.e., other signal transmission sources which transmit signals concurrently with a signal transmission source in question are simulated as far-end crosstalk to which the receiving end is susceptible, and the signals to be transmitted and the simulated far-end crosstalk signals are synthesized at the signal receiving end. For reality of the cancelled far-end crosstalk signals, a feedback is made at the signal receiving end in accordance with the received branch of signals to be transmitted so as to constantly obtain new filter weight coefficients for convergence. Therefore, the signals before transmission can be controlled constantly and effectively to cancel future possible noise in advance, and a far-end crosstalk introduced during transmission of the signals can counteract with the previous simulated far-end crosstalk signals when the signal receiving end receives the signals, to regenerate the essential real signals. Theoretical and simulation experimental studies have demonstrated good convergence and crosstalk cancellation effects. As can be seen, the embodiments of the present invention inventively enable combination of the adaptive filter technique and the coordinated signal transmission and receiving technique to avoid the difficulty in pre-learning a channel transmission matrix in an existing fixed filter solution, to avoid modification of an existing standard and to attain a superior effect of canceling the crosstalk signals.

The multi-channel signal processing system, the filter device, and the multi-channel signal processing method according to the embodiments of the invention can be applicable in various scenarios, provide good market adaptability and facilitate the use of the above appropriate embodiments to process signals by a user on his own demand.

BRIEF DESCRIPTION OF THE DRAWINGS

FIG. 11 is a block diagram of a first embodiment of a signal processing adaptation card according to the present invention;

FIG. 12 is a block diagram of a first embodiment of a signal transmission device according to the present invention;

FIG. 13 is a flow diagram of a first embodiment of a method for manufacturing a signal processing device according to the present invention;

FIG. 14 is a block diagram of a first embodiment of a signal reception device according to the present invention; and FIG. 15 is a flow diagram of a first embodiment of a multi-channel signal processing method according to the present invention.

DETAILED DESCRIPTION OF THE INVENTION

Figure 1:
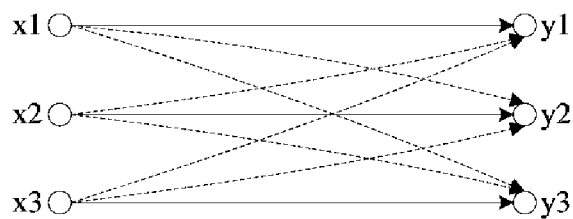
FIG. 1 is a schematic diagram illustrating crosstalk between transmission channels in the conventional art.

Embodiments of the present invention can cancel a far-end crosstalk over an xDSL line in the time and frequency domains. Implementation solutions of the invention are described in detail below.

In order to facilitate understanding of the embodiments of the present invention, a basic principle of an adaptive filter is firstly introduced in brief. The adaptive filter may be a Least Mean Square (LMS) adaptive filter which may be classified into a general LMS filter and a block LMS filter. A statistic filter (taking a Wiener filter as an example) and an LMS filter are introduced in brief below 1. Statistic Filter A model of a statistic filter is based upon such a principle that a linear discrete filter is designed on the premise that an input signal and an output response are given, so as to minimize a mean square of the difference between an output of the filter and the expected response.

The statistic filter relates to the following calculation formula:

1) Wiener-Hopf Equation $$\sum_{i=0}^{M-1} w_i r(i-k) = p(-k)$$

where w denotes a weight coefficient of the statistic filter, k=0, 1, 2, ... M−1.

If the above equation is rewritten into a vector form, then:

2) wH=p where w denotes a weight coefficient vector of the statistic filter, H denotes an autocorrelation matrix of the input signal, and p denotes a cross correlation vector of the expected response and the input signal.

If the matrix H is invertible, then the optimal weight coefficient may be expressed as:

3) $w_o = H^{-1} p$

This is the optimal solution of Wiener-Hopf.

2. LMS Filter

1) Fast Descent Method

If a series of weight coefficients w(1), w(2), w(3), ..., are generated starting with an initial weight coefficient so that a cost function is decreased with each new weight coefficient, that is:

$$J(w(n+1)) < J(w(n))$$

Then, the optimal weight coefficient can be found eventually. The use of a gradient method will readily occur, in which the weight coefficient can be adjusted by a certain step in a negative gradient direction, so as to attain the above hypothesis as follows:

$$w(n+1) = w(n) - \frac{1}{2}\mu \nabla J(w)$$

From the above derivation in the last section, we have $\nabla J(w)=2(p-Hw)$. While substituting $-2(p-Hw)$ for $\nabla J(w)$ in the above formula we have:

$$w(n+1)=w(n)-\mu(p-Hw(n)), n=0, 1, 2, \ldots.$$

This formula is an iterative formula for a most rapid descent algorithm.

As can be seen, the most rapid descent algorithm attains simplified calculations as compared with direct solving of the Wiener-Hopf equation, because it is not necessary to solve an inversion of the input autocorrelation matrix. However, it is necessary to have a prior knowledge of an input autocorrelation matrix, an expectation and input cross correlation vector, etc.

2) Least Mean Square (LMS) Algorithm

The least mean square algorithm is implemented in such a basic principle that the input autocorrelation matrix, the expectation and input cross correlation vector are respectively replaced with a transient input autocorrelation matrix, and a transient expectation and input cross correlation vector. In other words, H is replaced with $R(n)=u(n)u^T(n)$ and p is replaced with $p(n)=u(n)d(n)$. Then, the formula of the rapidest descent algorithm may be rewritten as:

$$w(n+1) = w(n) - \mu(u(n)d(n) - u(n)u^T(n)w(n))$$
$$= w(n) - \mu(u(n)(d(n) - y(n)))$$
$$= w(n) - \mu e(n)u(n)$$
$$n = 0, 1, 2, \ldots.$$

The above formula is a weight coefficient iterative formula of the LMS algorithm.

Figure 2:
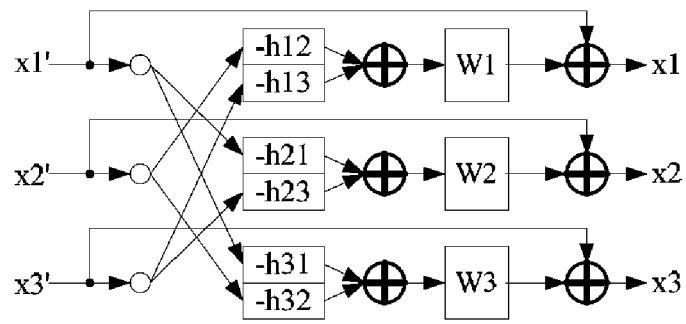
FIG. 2 is a mathematical model for crosstalk cancellation according to the invention.

Because the embodiments of the present invention are provided to solve the problem of a crosstalk between signals, an influence of other factors of noise, line attenuation, etc., is not taken into account. In view of generality, concurrent transmission of N branches of signals may be assumed. Referring to FIG. 2, a channel transmission equation in the time domain during coordinated transmission and reception of multiple channels of signals may be expressed as follows:

$$\begin{cases} x_1 = x_1' - h_{11}^{-1} * h_{12} * x_2' - h_{11}^{-1} * h_{13} * x_3' \\ x_2 = -h_{22}^{-1} * h_{21} * x_1' + x_2' - h_{22}^{-1} * h_{23} * x_3' \\ x_3 = -h_{33}^{-1} * h_{31} * x_1' - h_{33}^{-1} * h_{32} * x_2' + x_3' \end{cases}$$

where $x_1'$ $x_2'$ and $x_3'$ denote signal transmitting points, x1, x2 and x3 denote corresponding far-end signal reception points, hij denotes a crosstalk function of a crosstalk source j with respect to signals to be transmitted i, and "*" denotes a convolution.

An embodiment of signal processing for crosstalk cancellation corresponding to the above descriptions is provided below.

Figure 3:
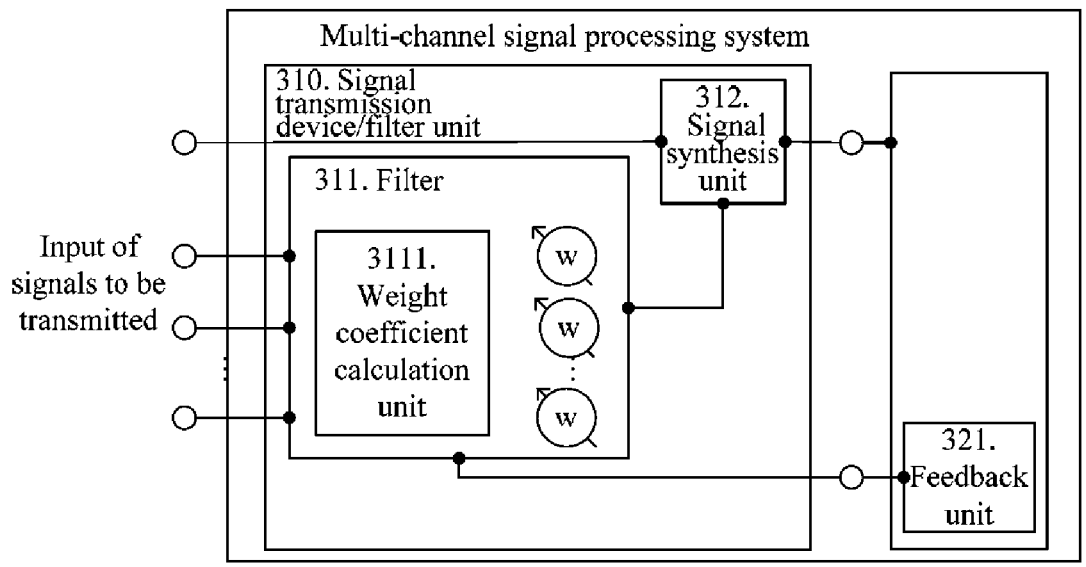
FIG. 3 is a block diagram of a first embodiment of a multi-channel signal processing system according to the present invention.
Figure 4:
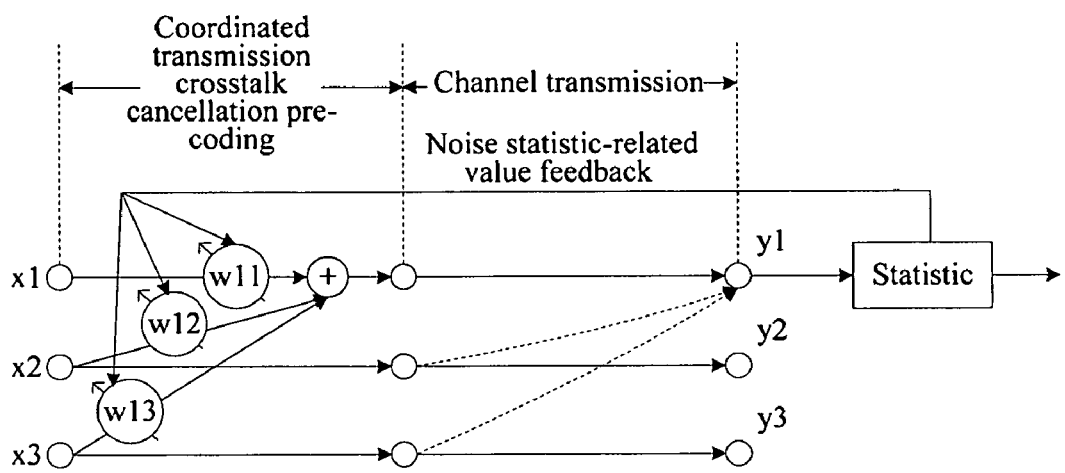
FIG. 4 is a schematic diagram of signal processing of crosstalk cancellation in FIG. 3.

FIG. 3 and FIG. 4 are a structural diagram and a schematic diagram of signal processing according to a first embodiment of a multi-channel signal processing system of the present invention, respectively. The multi-channel signal processing system includes a filter unit 310 arranged at a signal transmitting end, and a feedback unit 321 arranged at a signal receiving end. The filter unit 310 includes a signal synthesis unit 312 and multiple filters W. Each of the multiple filters W includes a weight coefficient calculation unit 3111. An input of the signal synthesis unit 312 is coupled with a branch of signals to be transmitted.

Particularly, the filter W is adapted to filter crosstalk source signals corresponding to the branch of signals to be transmitted by use of filter weight coefficients, and the crosstalk source signals may be signals to be transmitted from the same transmission path other than the branch of signals to be transmitted. The signal synthesis unit 312 is adapted to synthesize the branch of signals to be transmitted and the filtered crosstalk source signals, for the purpose of crosstalk signal cancellation of the signals to be transmitted. Specifically, the signals to be transmitted and the crosstalk source signals may be synthesized by scalar or vector addition, subtraction, multiplication, division. The feedback unit 321 makes a feedback in response to the received branch of signals to be transmitted. The weight coefficient calculation unit 3111 is adapted to calculate new filter weight coefficients in accordance with feedback information as new filter parameters.

In this embodiment, the filter is adopted to simulate and generate far-end crosstalk signals of signals before transmission, i.e., the filter simulates another signal transmission source which transmits signals concurrently with a signal transmission source in question as a far-end crosstalk to which the receiving end is susceptible, and a "pre-coding" approach is adopted so that the signal synthesis unit 312 synthesizes at the signal transmitting end the signals to be transmitted and the simulated far-end crosstalk signals. For reality of the cancelled far-end crosstalk signals, the feedback unit 321 feeds back the received branch of signals at the signal receiving end, and the weight coefficient calculation unit 3111 constantly obtains and iterates the new filter weight coefficients for convergence. Therefore, the signals can be "pre-coded" constantly and effectively to cancel future possible noise in advance before transmission, and a far-end crosstalk introduced during the signal transmission can counteract with the previous simulated far-end crosstalk signals when the signal receiving end receives the signals, thereby regenerating essentially real signals. As can be seen, this embodiment enables simple and convenient combination of the adaptive filter technique and the coordinated signal transmission and reception technique, to attain a better effect of the crosstalk signals cancellation.

Figure 5:
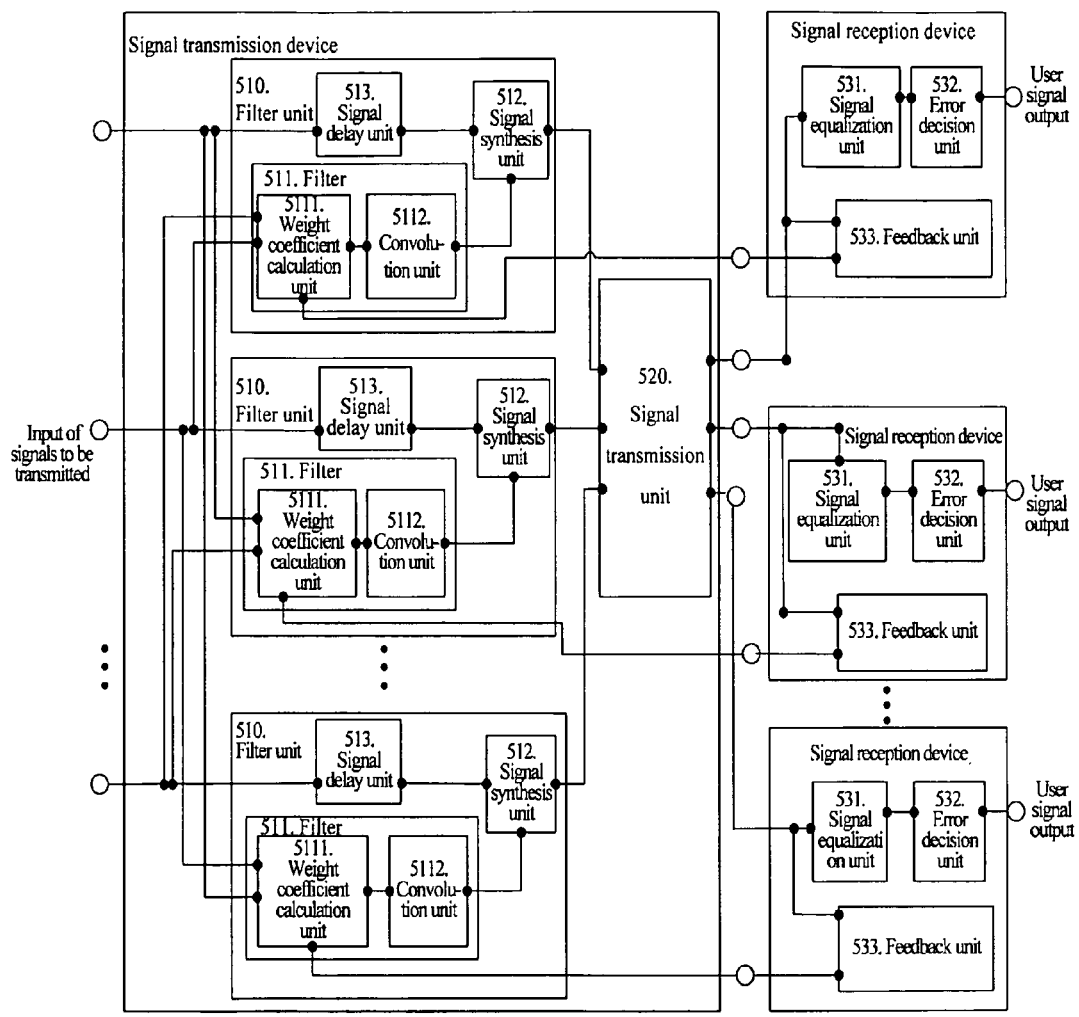
FIG. 5 is a detailed diagram the multi-channel signal processing system in FIG. 3.

FIG. 5 is a detailed diagram of an embodiment of signal processing system. The signal processing system includes: a signal delay unit 513 and a filter unit 510 arranged at a signal transmitting end, as well as a feedback unit 533, a signal equalization unit 531, and an error decision unit 532 arranged at a signal receiving end. The filter unit 510 includes a signal synthesis unit 512 and a plurality of filters 511. An input of the signal synthesis unit 512 is coupled with a branch of signals to be transmitted. The signal delay unit 513 is connected with the input of the signal synthesis unit 512.

The filter 511 is adapted to simulate and generate far-end crosstalk signals corresponding to the branch of signals to be transmitted, taking other branches of signals at the transmitting end respectively as crosstalk sources for the branch of signals to be transmitted over the same transmission path. The crosstalk sources refer to other signals to be transmitted which may cause a far-end crosstalk to the branch of signals to be transmitted. The filter 511 includes a weight coefficient calculation unit 5111 and a convolution unit 5112. The convolution unit 5112 is adapted to convolute the signals of the crosstalk source with corresponding filter weight coefficients, and superpose convoluted signals to obtain simulated far-end crosstalk signals. For example, if a first one of three branches of signals is pre-coded for filtering, the second branch of signals is used as the filter 511 corresponding to a simulated far-end crosstalk source of the first branch of signals, and the third branch of signals is used as the filter 511 corresponding to a simulated far-end crosstalk source of the first branch of signals. The above two filters 511 output a convolution result to the signal synthesis unit 512.

The signal synthesis unit 512 is adapted to receive the crosstalk source signals filtered by the filter 511, and to synthesize the crosstalk source signals and the branch of signals to be transmitted.

Referring also to FIG. 4, all the pre-coding filters are taken into account. Signals at respective signal transmitting points are written as follows:

$$x_1 = D * x'_1 - w_{12} * x'_2 - w_{13} * x'_3$$
$$x_2 = D * x'_2 - w_{21} * x'_1 - w_{23} * x'_3$$
$$x_3 = D * x'_3 - w_{31} * x'_1 - w_{32} * x'_2$$
$$y_{11} = h_{11} * x_1 + h_{12} * x_2 + h_{13} * x_3 + n_1$$
$$= (h_{11}D - h_{12}w_{21} - h_{13}w_{31})x'_1 + (h_{12}D - h_{13}w_{32})x'_2 +$$
$$(h_{13}D - h_{12}w_{21})x'_3 + n_1 - (h_{11}w_{12}x'_2 + h_{11}w_{13}x'_3)$$
$$y_{12} = (h_{11}D - h_{12}w_{21} - h_{13}w_{31})g_{11}x'_1 + (h_{12}D - h_{13}w_{32})g_{11}x'_2 +$$
$$(h_{13}D - h_{12}w_{21})g_{11}x'_3 + n_1g_{11} - (h_{11}w_{12}x'_2 + h_{11}w_{13}x'_3)g_{11}$$
$$y_{12} = (h_{11}D - h_{12}w_{21} - h_{13}w_{31})g_{11}x'_1 - Dx'_1 + (h_{12}D - h_{13}w_{32})g_{11}x'_2 +$$
$$(h_{13}D - h_{12}w_{21})g_{11}x'_3 + n_1g_{11} - (h_{11}w_{12}x'_2 + h_{11}w_{13}x'_3)g_{11}$$

where wij denotes a filter weight coefficient of a crosstalk source j with respect to signals to be transmitted i, g11 denotes a weight coefficient of a filter which works as signal equalization, and $$h = \begin{bmatrix} h_{11} & h_{12} & \ldots & h_{1N} \\ h_{21} & h_{22} & \ldots & h_{2N} \\ \vdots & \vdots & \ddots & \vdots \\ h_{N,1} & h_{N2} & \ldots & h_{NN} \end{bmatrix}$$

denotes a channel transmission matrix;

where D denotes an appropriate delay of signals, which is not distinguished strictly while having little any influence on an analysis. A convolution can be represented although a convolution sign is omitted in expressions that follow. Of course, a delay filter D may be regarded as one kind of time-domain filters, which is arranged for the purpose of synthesizing the signals to be transmitted with the filtered crosstalk source signals at an appropriate time so that pre-coding of the signals arriving at the receiving end can cancel properly a far-end crosstalk generated by the crosstalk source at that time. A delay amount is primarily dependent upon a specific operation environment of lines and the number of orders of the filter in use, and therefore the delay filter 511 may not necessarily be adjusted with a feedback from the receiving end.

The pre-coded signals are transmitted to the signal receiving end, and the feedback unit 533 of the signal receiving end executes a feedback operation in accordance with the received branch of signals to be transmitted, i.e., sends a feedback value of the branch of signals to be transmitted to the weight coefficient calculation unit 5111.

The weight coefficient calculation unit 5111 is adapted to iterate the filter weight coefficients in accordance with an error value or an error sign of the fed back branch of signals to be transmitted and an expected response, so as to calculate new filter weight coefficients. The feedback signal error value or signal error sign is transmitted in the frequency or time domain in a feedback loop. Time-domain information is firstly generated in the weight coefficient calculation unit 5111 in the case of transmission in the frequency domain. The new filter weight coefficients obtained from the iteration are input to a crosstalk cancellation unit for subsequent filtering operations. The following iterative formula is used for the iteration calculation:

$$w(n+1) = w(n) + 2\lambda \cdot e(n) \cdot h^T U$$

where, w(n+1) and w(n) denotes filter parameters after or before the (n+1)th iteration respectively, $h = [h_0 \ h_1 \ \ldots \ h_{M-1}]^T$ denotes a direct channel, U denotes an input matrix, $2\lambda$ denotes a predetermined step, and e(n) denotes the error signals.

After obtaining the new filter weight coefficients, the filter 511 inputs the new filter weight coefficients to the crosstalk cancellation unit. The crosstalk cancellation unit adopts the following channel transmission equation:

$$\begin{cases} x_1 = x'_1 - h_{11}^{-1} * h_{12} * x'_2 - h_{11}^{-1} * h_{13} * x'_3 \\ x_2 = -h_{22}^{-1} * h_{21} * x'_1 + x'_2 - h_{22}^{-1} * h_{23} * x'_3 \\ x_3 = -h_{33}^{-1} * h_{31} * x'_1 - h_{33}^{-1} * h_{32} * x'_2 + x'_3 \end{cases}$$

After a crosstalk cancellation, a following cycle occurs, so that the signal error received by the signal receiving end is decreased until the error is below a threshold.

The filtered signals transmitted to the signal receiving end are input to the signal equalization unit 531 for signal equalization, and then input to the error decision unit 532 for error decision. The feedback unit 533 may be arranged at a selected one of an input y11 of the signal equalization unit 531, a node y12 between the signal equalization unit 531 and the error decision unit 532, and an output y13 of the error decision unit 532. Herein, different feedback points of the feedback unit 533 may consequently have different effects. Three kinds of feedback points are described below respectively.

1) The feedback point of the feedback unit 533 is connected with the input y11 of the signal equalization unit 531.

The optimal weight coefficients of the adaptive filter 511 are considered from the perspective of the Viener filter 511. Although two adaptive filters 511 are in use, only the case of the w12 filter 511 is examined below in view of symmetry. Therefore, an output of the w13 adaptive filter 511 becomes a part of the expected response.

A cross correlation vector of the excepted response and an input of the adaptive filters 511 can be:

$$p_1 = E[(h_{12}{}^T S_2 D - h_{13}{}^T S_2 w_{32}) \cdot S_2{}^T h_{11}]$$

An autocorrelation matrix of the input of the adaptive filter 511 can be:

$$R_1 = E[h_{11}{}^T S_2 \cdot S_2{}^T h_{11}],$$

where S2 in the above two formulas denotes an input matrix of signals s2.

The optimal weight coefficients of w12 are:

$$w_{12} = \frac{p_1}{R_1} = \frac{E[(h_{12}^T S_2 D - h_{13}^T S_2 w_{32}) \cdot S_2^T h_{11}]}{E[h_{11}^T S_2 \cdot S_2^T h_{11}]}.$$

As can be seen from this formula, the optimal weight coefficients of the filter 511 are correlated with only s2, h12, h11, h13 and w32, and uncorrelated with signal s1 and noise (n1). This is derived from no correlation of the signals s2 with s1, s3 and n1.

In a practical implementation, the signal transmitting end may stop the transmission of the branch of signals to be transmitted during the feedback of the signals to reduce interference.

The optimal weight coefficients are correlated with w32, and if the crosstalk transmission matrix is a diagonally dominant matrix, the influence may be negligible (which may be below background noise). If the crosstalk transmission matrix is not a diagonally dominant matrix, an iterative adaptive process may be executed respectively for the w12 and w32 adaptive filters in practice.

If the delay process over the path of the signals to be transmitted is regarded as a filtering process, the signals fed back from the feedback point may not be fed back to an execution body of the delay operation.

2) The feedback point of the feedback unit 533 is connected at y12 between the signal equalization unit 531 and the error decision unit 532.

The error signals fed back from the feedback point 2 pass through an additional g11 filter 511 as compared with that from the feedback point 1. If g11 and the other filters 511 are regarded as a new integrated filter 511, an analysis of the feedback point 2 has substantially no difference from the feedback point 1.

Because a gain of the g11 filter 511 is greater than 1, all components of the signals are amplified. Similarly, if the delay process over the path of the signals to be transmitted is regarded as a filtering process, the signals fed back from the feedback point may not be fed back to an execution body of the delay operation.

3) The feedback point of the feedback unit 533 is connected at the output y13 of the error decision unit 532.

The optimal Winner solution determined by the signals, which are fed back from the feedback point 3, is consistent with that of the feedback point 2, but the expected response is changed to inclusion of only a residual difference of the data signals. Therefore, although the optimal Winner solution is not changed, the error signals are subject to less interference in a practical operation, and the filter 511 may be adapted concurrently with transmission of s1. This is one of advantages of the feedback point.

Furthermore, in an existing standard, it is convenient to feed back signals from this feedback point although signals from this feedback point is in the frequency domain format typically, and an IFFT transform shall be needed for an application in the time-domain filter 511.

Because the expected response and the error signals are available only at the signal receiving end, the feedback unit 533 in this embodiment can accomplish this function. The feedback signal errors can be converted into error signs which are fed back to the respective filters 511 over EOC channels to reduce the workload of the feedback unit 533.

Obviously the filtering process of the single branch of signals to be transmitted may be naturally extended to the respective branches of signals. For example, the branches of signals x1 and x3, which are regarded as crosstalk sources for the branch of signals x2, may be filtered with the w21 filter 511 and the w23 filter 511, respectively. In this circumstance, a feedback required for the w21 and w23 filters 511 is from the y2 end.

Figure 6:
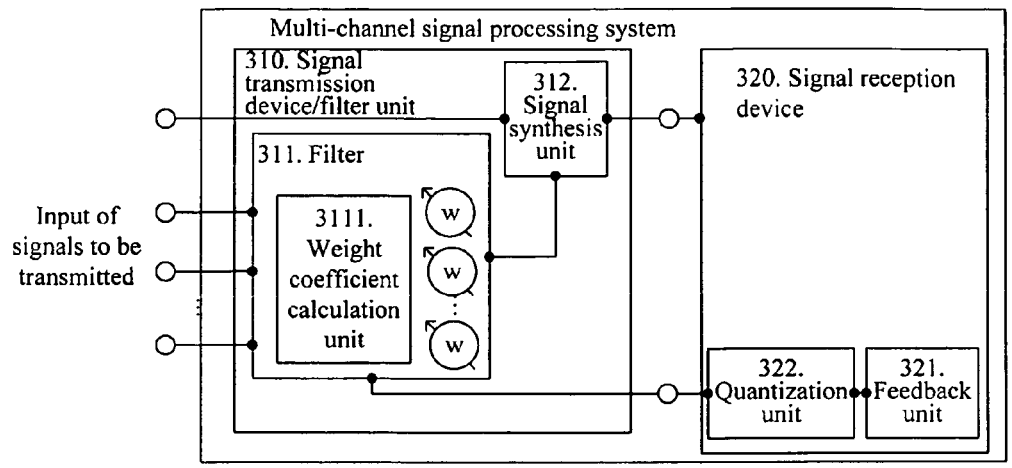
FIG. 6 is a block diagram of a second embodiment of a multi-channel signal processing system according to the present invention.

FIG. 6 is another embodiment of a multi-channel signal processing system according to the present invention. Reference can also be made to FIG. 3 for this embodiment. This embodiment is different from the multi-channel signal processing system illustrated in FIG. 3 in that a quantization unit 322 used to quantize error signals with a very low precision may be arranged over a feedback loop in the signal reception device 320, so as to reduce the amount of feedback data. In the case of the low quantization precision, the quantized error signals represent only signs of the error signals.

If the sign of the error signal is used as a feed magnitude, a formula to update weight coefficients of an LMS filter may be $$\vec{w}(n+1) = \vec{w}(n) + \mu \cdot \text{sign}[e(n)] \cdot \vec{x}(n)$$

where sign [•] denotes an operation of obtaining a sign and may be expanded as follows:

$$\text{sign}[x] = \begin{cases} +1 & \text{if } x > 0 \\ 0 & \text{if } x = 0 \\ -1 & \text{if } x < 0 \end{cases}$$

Therefore, the data amount can be reduced greatly. If the error signals are represented originally with a precision of 8 bits, it can be represented with only two bits, thereby resulting in a reduction to one fourth of the data amount. Actually, if sign[•] is further represented as:

$$\text{sign}[x] = \begin{cases} +1 & \text{if } x > 0 \\ -1 & \text{if } x \leq 0, \end{cases}$$

the error signals may further be represented with one bit, thereby resulting in a reduction to one eighth of the data amount, as compared with those represented with eight bits.

Figure 8:
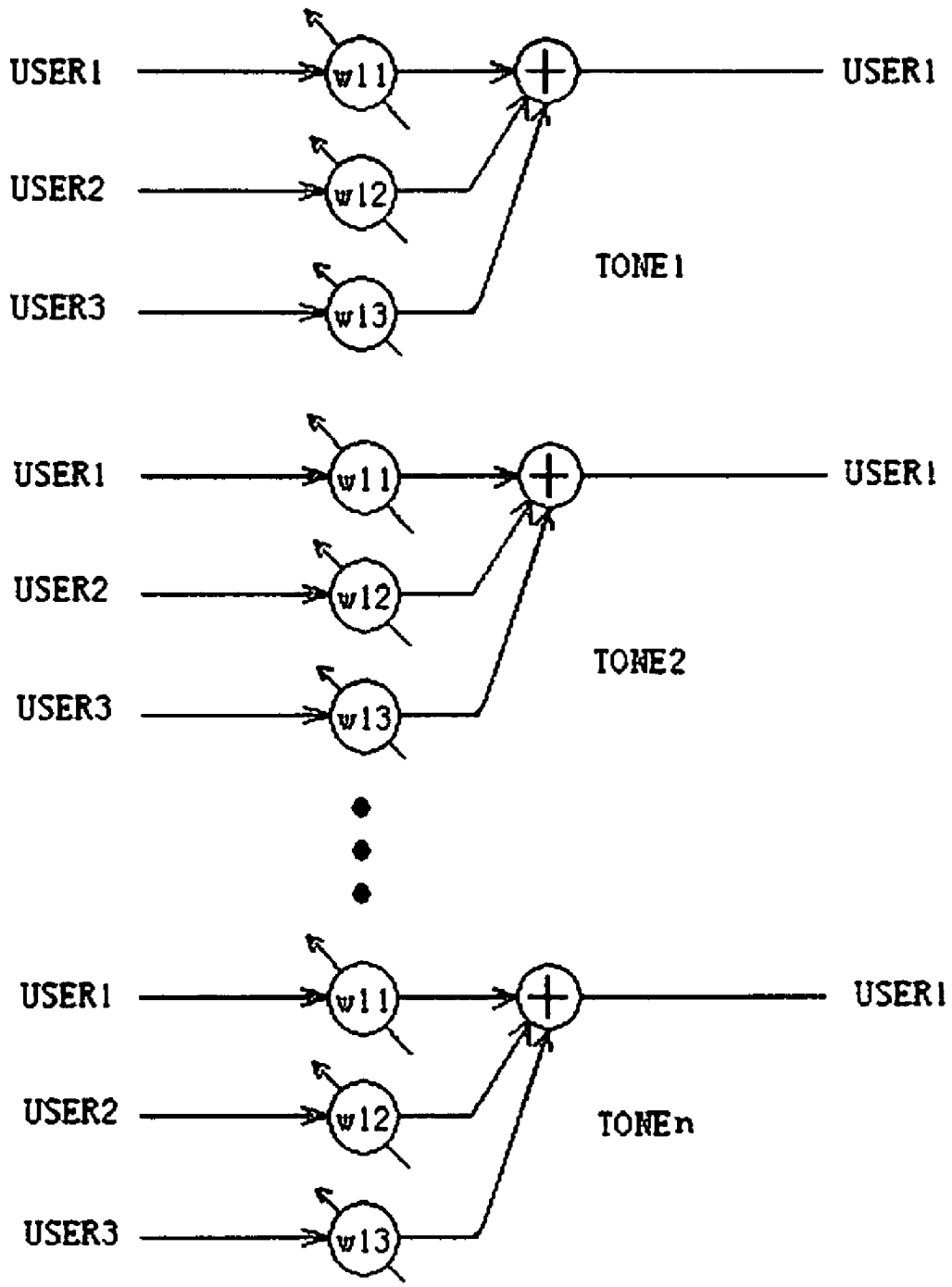
FIG. 8 is a block diagram of a fourth embodiment of a multi-channel signal processing system according to the present invention.

Because the error signals are complex-value signals in the frequency domain in a DMT modulation mode, the error signals may be used for a time-domain LMS adaptive filter at a CO end only after being converted into time-domain errors. The error conversion is illustrated in FIG. 8.

If the delay process over the path of the signals to be transmitted is regarded as filtering process, the signal fed back from the feedback point can also be fed back to an execution body w11 of the delay operation.

The filter 311 in the signal transmission device 310 may be a selected one of a general LMS adaptive filter, a block LMS adaptive filer, and an RLS filter, which are described as below respectively.

1) The General LMS Adaptive Filter or the Block LMS Adaptive Filter

If each feedback sign is an error sign at a specific time, this is equivalent to adopting a general LMS adaptive filter. Accordingly, an apparent benefit lies in that a data rate of 4 kbps as required for a feedback signal is sufficient.

If the EOC channel can further provide a greater data rate, a block LMS adaptive filter solution may be adopted. It can be implemented by sending more than one error signal each time to result in an error sign vector. A formula for updating weight coefficients is as follows:

$$\vec{w}(n+1) = \vec{w}(n) + \mu \cdot \text{sign}[\vec{e}(n)] \cdot X(n);$$

where x(n) denotes an input data matrix. If it is assumed that a dimension for the error sign vector is L, the required data rate for the feedback signal is 4 Lkbps.

The above two methods have their own disadvantages in that the general LMS adaptive filter has a low requirement on the rate of the EOC channel but has a long convergence time, and the block LMS adaptive filter has a high requirement on the rate of the EOC channel but has a short convergence time.

2) RLS Filter

Other filters such as an RLS filter may be used if there is a high requirement on a convergence rate in practice.

The time to feed back an error signal shall be taken into account in practice. As can be seen from an examination of the LMS filter, an error signal is in one-to-one temporal correspondence with an output vector in a weight coefficient update system, and a logic time corresponding to the time at which a sign of the error signal is obtained shall therefore be strictly consistent with an input signal. Herein, the number and location of the obtained feedback sign at the transmission and receiving ends may be specified directly in the standard, or determined via negotiation by the signal transmitting and receiving ends at the time of initialization.

Figure 7:
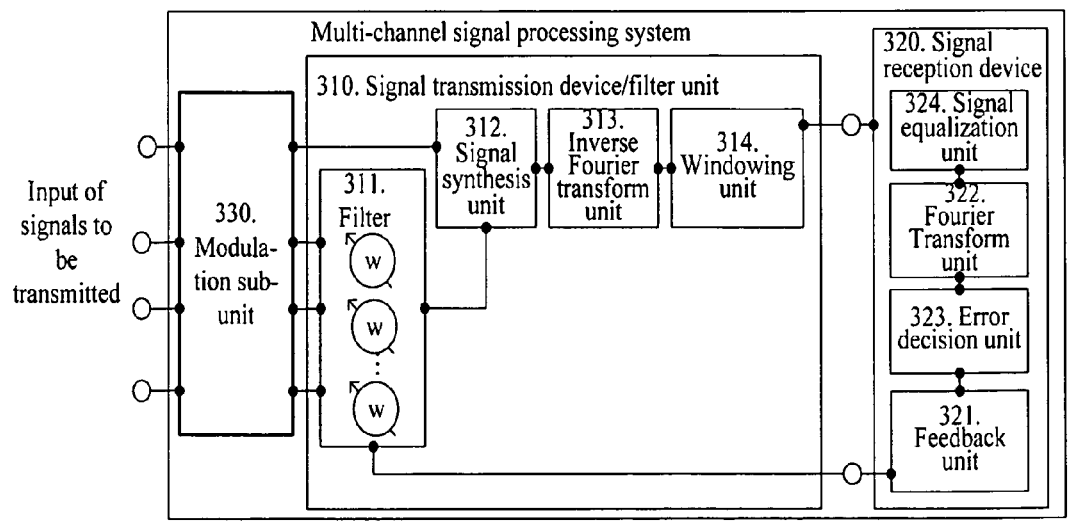
FIG. 7 is a block diagram of a third embodiment of a multi-channel signal processing system according to the present invention.

The above embodiment may be applicable in a downlink time-domain filtering scenario. A system structure illustrated in FIG. 7 may be adopted in correspondence with downlink frequency-domain filtering. The multi-channel signal processing system applicable in the frequency domain in FIG. 7 is substantially the same as the above multi-channel signal processing system applicable in the time domain, except that the filter unit 310 is a frequency-domain filter unit 310 with an output connected sequentially with an Inverse Fourier Transform unit 313 and a windowing unit 314, and that the multi-channel signal processing system further includes a signal equalization unit 324, a fast Fourier transform unit 322 and an error decision unit 323 at the signal receiving end.

Because Orthogonal Frequency Division Multiplexing (OFDM) system is used in xDSL, an operation on an orthogonal sub-band may be equally applicable to any other orthogonal sub-band.

Any filter 311 that can be implemented in the time domain may be equivalent to a coefficient, which is typically denoted with a complex number, multiplied by a different sub-band in the frequency domain. The complex number has a modulus indicating a gain over the band, and a phase angle indicating a leading or lag phase response over the band. Particularly, the sub-bands are orthogonal to each other in the orthogonal frequency division multiplexing system, i.e., the coefficient of any one of the sub-bands may be adjusted without any influence on the other sub-bands.

Compared with filtering in the time domain, time-domain signals shall firstly be converted into frequency signals to be filtered in the frequency domain. That is, a block modulation sub-unit 330 is arranged inside or outside the filter unit 310 to modulate components of signals to be transmitted and crosstalk source signals of the signals to be transmitted over respective sub-carriers and the filter 311 is adapted to frequency-domain filter the components of the crosstalk source signals of the signals to be transmitted, output from the modulation sub-unit 330, over the sub-carriers, to adjust filter weight coefficients in a selected direction that errors of receiving signals decrease according to the feedback signals, and to distribute the components of the feedback signals over the sub-carries to corresponding sub-carrier component filter procedures. In this case, the filter 311 may be regarded as a set of filters, which includes sub-filters corresponding to the sub-carrier components. The sub-filters filters the sub-carrier components respectively, and the feedback signals are coupled with the sub-filters according to the corresponding sub-carrier components. The Inverse Fourier Transform unit 313 is adapted to perform Inverse Fourier Transform on the components over the sub-carries which are synthesized by the signal synthesis unit 312, and to output time-domain signals, which are windowed by the windowing unit 314 to output.

After the signal reception device 320 receives multiple branches of signals, the branches of signals pass respectively through the signal equalization unit 324, the fast Fourier transform unit 322 and the error decision unit 323 for a delay decision feedback subtraction, so as to obtain frequency-domain error signals E1, E2 and E3.

FIG. 8 illustrates an example of crosstalk cancellation of a user 1 by three users (USER) and n tones (TONE). Frequency-domain signals of a certain TONE input by the respective users are multiplied by a coefficient respectively, and then added together to obtain crosstalk-free signals. The coefficients of the filters may be fixed or adaptive.

If LMS adaptive filtering in the frequency domain is adopted, the weight coefficients are updated with the following formula:

$$w(n+1)=w(n)+2\lambda e(n)\overline{X}(n);$$

where w, e and X are variables in the frequency domain, and $\overline{X}(n)$ denotes conjugation.

Figure 9:
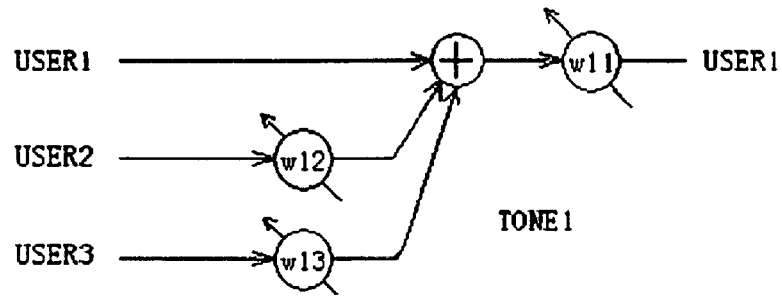
FIG. 9 is a block diagram of a fifth embodiment of a multi-channel signal processing system according to the present invention.

With the filter unit in FIG. 9, a feedback signal error is a signal error obtained by decision feedback by the error decision unit. An output of each filter at the signal receiving end is an equalization result, where w11 functions as a frequency-domain equalizer. In this case, all the filters shall be updated if a new user joins. Moreover, upon the condition that a user quits, it is unnecessary to update the parameters of the filter if the filter of the user is still enabled, however, all the filters shall be updated if the filter of the user is disabled.

With the filter unit in FIG. 9, if a user, e.g., the third user, joins, only w13 and w11 shall be updated without updating weight coefficients of the other filters (e.g., w12). If a user quits, or similarly if w13 is disabled, only w11 shall be updated. This structure can facilitate activeness or inactiveness of users in the case of a large number of users.

In an embodiment of the present invention, the signal transmitting/receiving device may be a digital signal processing chip or a field programmable gate array chip.

The present invention further provides a first embodiment of a filter device. A structure of the filter device may refer to a filter unit 510 in FIG. 5. The filter unit 510 includes a signal synthesis unit 512 and a plurality of filters 511. Each of the filters 511 includes a weight coefficient calculation unit 5111. An input of each signal synthesis unit 512 is coupled with a branch of signals to be transmitted.

The filter 511 is adapted to filter crosstalk source signals of the branch of signals to be transmitted with filter weight coefficients.

The signal synthesis unit 512 is adapted to receive the crosstalk source signals filtered by the filter 511, and to synthesize the branch of signals to be transmitted and the filtered crosstalk source signals.

The weight coefficient calculation unit 5111 is adapted to calculate new filter weight coefficients in accordance with feedback information of the branch of signals to be transmitted.

In the above embodiment, a "pre-coding" approach is adopted in which the filter 511 simulates and generates far-end crosstalk signals of signals before transmission, i.e., the filter simulates other signal transmission sources which transmit signals concurrently with a signal transmission source in question as far-end crosstalk to which the receiving end is susceptible, so that the signal synthesis unit 512 synthesizes the signals to be transmitted and the simulated far-end crosstalk signals at the signal receiving end. For reality of the cancelled far-end crosstalk signals, the weight coefficient calculation unit 5111 constantly generates and iterates new filter weight coefficients for convergence after a feedback is made at the signal receiving end. Therefore, the signals to be transmitted may be "pre-coded" constantly and effectively to cancel future possible noise in advance, and a far-end crosstalk introduced during transmission of the signals will counteract with the previous simulated far-end crosstalk signals when the signal receiving end receives the signals, so as to regenerate the essential real signals. As can be seen, this embodiment inventively enables combination of the adaptive filter technique and the coordinated signal transmission and reception technique to attain a better effect of the crosstalk signals cancellation.

Figure 10:
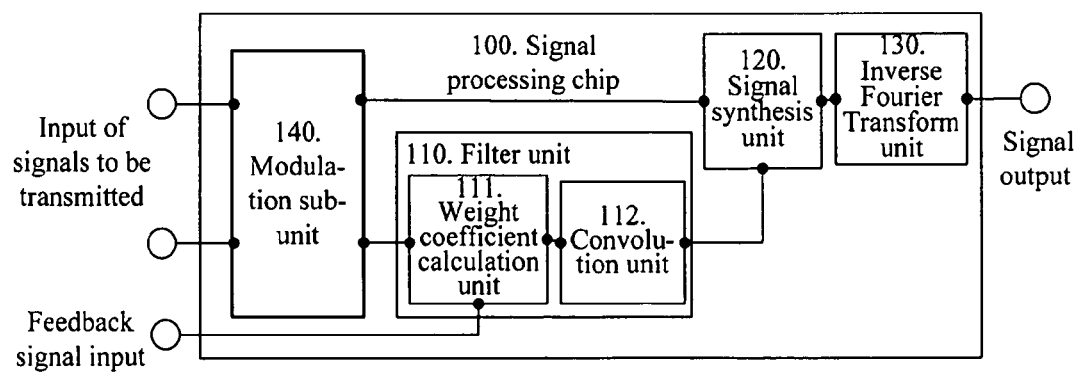
FIG. 10 is a block diagram of a first embodiment of a signal processing chip according to the present invention.

Referring to FIG. 10, the invention further provides a first embodiment of a signal processing chip 100 including: (1) a modulation sub-unit 140, connected respectively with an input of signals to be transmitted and a crosstalk source signal input, and adapted to modulate components of signals to be transmitted and crosstalk source signals of the signals to be transmitted over respective sub-carriers, and to input a modulation result to a signal synthesis unit 120 and a filter unit 110 respectively; (2) the filter unit 110, adapted to filter the crosstalk source signals of the branch of signals to be transmitted by using filter weight coefficients; (3) the signal synthesis unit 120, adapted to receive the filtered crosstalk source signals output from the filter unit 110, and to synthesize the branch of signals to be transmitted and the filtered crosstalk source signals; (4) the input of signals to be transmitted connected with the signal synthesis unit 120; (5) the crosstalk source signal input connected with the filter unit 110; and (6) a feedback signal input, which is connected with the filter unit 110, adapted to receive feedback signals of the signals to be transmitted at a receiving end; and (7) the filter unit 110 includes a weight coefficient calculation unit 111 adapted to perform iterative calculations in accordance with the filter weight coefficients, the feedback signals and the crosstalk source signals, to obtain new filter weight coefficients.

The filter unit 110 further includes a convolution unit 112 adapted to convolute the crosstalk source signals with the corresponding filter weight coefficients; and an Inverse Fourier Transform unit 130, adapted to receive an output of the signal synthesis unit 120.

This embodiment may be used as a general chip in a signal transmission system, with advantages of powerful functions, a low cost and good maintainability.

Referring to FIG. 11, the present invention further provides a first embodiment of a signal processing adaptation card. As substantially the same as the first embodiment of the signal processing chip 100, this embodiment includes: (1) a filter unit 110, adapted to filter crosstalk source signals of a branch of signals to be transmitted by using filter weight coefficients; (2) a signal synthesis unit 120, adapted to receive the filtered crosstalk source signals output from the filter unit 110, and to synthesize the branch of signals to be transmitted and the filtered crosstalk source signals; (3) a signal transmission unit 160, adapted to receive the signals synthesized by the signal synthesis unit 120, and to modulate and transmit the synthesized signals; and (4) an adaptation interface 150. The adaptation interface 150 includes an input of signals to be transmitted connected with the signal synthesis unit 120, a crosstalk source signal input connected with the filter unit 110, a feedback signal input connected with the filter unit 110 and adapted to receive feedback signals of the signals to be transmitted at a receiving end, and a signal output connected with the Fourier Transform unit.

Due to the adaptation interface, this embodiment can enable a modular board card easy to maintain and install. The signal transmission unit 160 may be provided to implement a transmission function on the same card, which may be particularly suitable to a small system.

Referring to FIG. 12, the present invention further provides a first embodiment of a signal transmission device including: (1) a signal processing unit 122, adapted to filter crosstalk source signals of a branch of signals to be transmitted by using filter weight coefficients, and to synthesize the branch of signals to be transmitted and the filtered crosstalk source signals; (2) a signal transmission unit 125, adapted to receive and transmit the signals synthesized by the signal processing unit 122; and (3) a feedback signal processing unit 126, adapted to receive a feedback of the signals to be transmitted at the receiving end, and to calculate new filter weight coefficients for the next filtering operation in accordance with the feedback information, i.e., to perform iterative calculations in accordance with the filter weight coefficients, the feedback signals and the crosstalk source signals to obtain the new filter weight coefficients.

The signal processing unit 122 includes a convolution unit 1221 adapted to convolute the crosstalk source signals with the corresponding filter weight coefficients.

The device further includes a modulation sub-unit 121 and an Inverse Fourier Transform unit 124. The modulation sub-unit 121 is adapted to modulate components of the signals to be transmitted and the crosstalk source signals of the signals to be transmitted over respective sub-carriers, and to output them respectively to the signal processing unit 122. The Inverse Fourier Transform unit 124 includes an input connected with an output of the signal processing unit 122, and an output connected with an input of the signal transmission unit 125.

The signal transmission device may have other structures, which may refer to but not limited to that in FIG. 5.

Referring to FIG. 13, the present invention further provides a first embodiment of a method for manufacturing a signal processing device including steps 131 and 132.

Step 131: A signal processing chip and a transmission unit are prepared. The signal processing chip is adapted to filter crosstalk source signals of a branch of signals to be transmitted by use of filter weight coefficients, to synthesize the branch of signals to be transmitted and the filtered crosstalk source signals, to receive feedback signals of the signals to be transmitted at a receiving end, and to carry out a calculation in accordance with the feedback information to obtain new filter weight coefficients for the next filtering operation. The signal transmission unit is adapted to receive and transmit the signals synthesized by the signal synthesis unit.

Step 132: An output of the signal processing chip is connected to an input of the transmission unit.

Further referring to FIG. 14, the present invention provides a first embodiment of a signal reception device including: (1) a reception unit 141, adapted to receive multiple branches of adaptively filtered signals; and (2) a feedback unit 144, adapted to feed back the respective branches of received signals respectively to a sender, the feedback signals being used to filter crosstalk source signals of the sender.

The signal reception device further includes a signal equalization unit 142 and an error decision unit 143. The signal equalization unit 142 is adapted to perform equalization process on signals output from the reception unit 141, and to transmit processed signals to the error decision unit 143. A feedback point of the feedback unit 141 is arranged at an input of the signal equalization unit 142, at a node between the signal equalization unit 142 and the error decision unit 143, or at an output of the error decision unit 143.

The signal reception device may have other structures, which may refer to but not limited to that in FIG. 5.

Referring to FIG. 15, the invention further provides a first embodiment of a multi-channel signal processing method including the steps 151-153.

Step 151: At least one branch of crosstalk source signals is filtered with initial filter weight coefficients at a signal transmitting end.

Step 152: A branch of signals to be transmitted and the filtered crosstalk source signals are synthesized, and the synthesized signals are transmitted to a signal receiving end.

Step 153: Filtering process is performed with new filter weight coefficients, which are obtained from a feedback of the branch of signals to be transmitted and can reduce a signal error at the receiving end.

As described above, this embodiment simulates and generates far-end crosstalk signals of signals before transmission, i.e., the embodiment simulates other signal transmission sources which transmit signals concurrently with a signal transmission source in question as a far-end crosstalk to which the receiving end is susceptible, so that the signals to be transmitted and the simulated far-end crosstalk signals are firstly synthesized at the signal transmitting end in a "precoding" approach. For reality of the cancelled far-end crosstalk signals, new filter weight coefficients are constantly obtained and iterated for convergence after a feedback is made at the signal receiving end. Therefore, the signals to be transmitted can be "pre-coded" constantly and effectively to cancel future possible noise in advance, and a far-end crosstalk introduced during transmission of the signals will counteract with the previous simulated far-end crosstalk signals when the signal receiving end receives the signals, so as to regenerate the essential real signals. As can be seen, this embodiment inventively enables combination of the adaptive filter technique and the coordinated signal transmission and reception technique, to attain a superior effect of the crosstalk signals cancellation.

The embodiment is detailed below which includes detailed steps 151 to 153.

Step 151: At least one branch of crosstalk source signals is filtered with initial filter weight coefficients at a signal transmitting end.

Downlink time-domain crosstalk source signals are filtered with initial filter weight coefficients.

Specifically, other branches of signals at the transmitting end than the signals to be transmitted are regarded as simulated crosstalk signal sources, and signals of each crosstalk signal source are convoluted respectively with corresponding filter weight coefficients, and superposed into simulated far-end crosstalk signals. The initial weight coefficients are used for the first filtering, and new weight coefficients are used for subsequent filtering. The filtering manner may be general LMS adaptive filtering or block LMS adaptive filtering.

Step 152: The branch of signals to be transmitted and the superposed far-end crosstalk source signals are synthesized, and the synthesized signals are transmitted to a signal receiving end.

A delay process is performed on the branch of signals to be transmitted before the synthesis of the branch of signals to be transmitted with the filtered crosstalk source signals.

Step 153: New filter weight coefficients are obtained in accordance with a feedback of the branch of signals to be transmitted, and the filter weight coefficients are iterated so as to reduce an error of the branch of signals to be transmitted which is received at the signal receiving end.

According to the above-described formula: $w(n+1)=w(n)+2\lambda \cdot e(n) \cdot h^T U$, where $h=[h_0\ h_1\ \ldots\ h_{M-1}]^T$ denotes direct channels, $w=[w_0\ w_1\ \ldots\ w_{N-1}]$ denotes filter weight coefficients, U denotes an input matrix, e(n) denotes an output error of a filter, and 2A denotes a step. If the detected output error of the filter, weight coefficients at a current time fed back to the signal transmitting end, and an output of the adaptive filter via the direct channel are inserted in the above formula at the downlink signal receiving end, filter weight coefficients at the next time can be calculated to make the iteration of the weight coefficients possible. The above formula indicates a gradient estimation in the weight coefficient iteration formula makes use of output thereof filtered by an H filter with same input of the filter, instead of a direct input of the adaptive filter, as a gradient estimation vector.

New filter weigh coefficients are obtained from a feedback of the branch of signals to be transmitted, particularly: (1) A signal error is obtained from the branch of signals to be transmitted which is received at the signal receiving end and fed back to the signal transmitting end, and the signal transmitting end obtains the new filter weigh coefficients in accordance with a value of the signal error and an expected response; or (2) A signal error sign is obtained from the branch of signals to be transmitted which is received at the signal receiving end and fed back to the signal transmitting end, and the signal transmitting end obtains the new filter weigh coefficients in accordance with the signal error sign and an expected response. The signal error sign is obtained by the steps of conjugating the signals in the frequency domain and performing an Inverse Fourier Transform of the signals.

The above feedback operations may be performed when the signal receiving end receives the branch of signals to be transmitted, after a signal equalization process is performed on the branch of signals to be transmitted, or after a general error decision process is performed on the branch of signals to be transmitted.

During a feedback of the signals, the signal transmitting end stops transmission of the branch of signals to be transmitted for filtering in the time domain, but not for filtering in the frequency domain.

An EOC channel may be used as a channel for transmitting feedback information during a feedback.

For filtering in the frequency domain, the step 152 may further include: synthesizing the branch of signals to be transmitted and the filtered crosstalk source signals, and performing an Inverse Fourier Transform on and windowing the signals. After the synthesized signals are transmitted to the signal receiving end, the method may further include: performing a signal equalization process, a Fast Fourier Transform, and a delay decision feedback subtraction to obtain an error signal.

Before synthesis of the branch of signals to be transmitted and the filtered crosstalk source signals, the branch of signals to be transmitted is filtered with frequency-domain equalization. In this case, all the filter weight coefficients are updated when a signal link is added; and when a signal link is removed, if filtering with frequency-domain equalization is not disabled, the filter weight coefficients may not be updated. If filtering with frequency-domain equalization is disabled, all the filter weight coefficients may be updated.

After synthesis of the branch of signals to be transmitted and the filtered crosstalk source signals, the branch of signals to be transmitted is filtered with frequency-domain equalization. In this case, all the filter weight coefficients are updated when a signal link is added; and when a signal link is removed, if filtering with frequency-domain equalization is not disabled, the filter weight coefficients may not be updated. If filtering with frequency-domain equalization is disabled, all the filter weight coefficients may be updated.

The signal processing system, the chip and the manufacturing method thereof, the filter device, the signal processing adaptation card and the signal transmission and reception device according to the invention have been described in detail as above, the principle and embodiments of the invention have been set forth by way of specific examples, and the above descriptions of the embodiments are intended merely to facilitate understanding of the inventive method and the essential idea thereof. Those ordinarily skilled in the art can modify the embodiments and their application scopes according to the invention. Accordingly, the disclosure of the specification shall not be taken in any way of limiting the scope of the invention.

The invention claimed is:

1. A multi-channel signal processing system, comprising:
   a filter configured to filter crosstalk source components corresponding to a branch of signals to be transmitted in accordance with filter weight coefficients;
   a weight coefficient calculation unit, configured to update the filter weight coefficients in accordance with feedback information, the feedback information being an error component of the branch of signals from a signal receiving end;
   a signal synthesis unit configured to receive the branch of signals and a filtered crosstalk source component, and synthesize the branch of signals and the filtered crosstalk source components;
   a feedback unit configured to generate and transmit the feedback information to the filter in accordance with signals received from the signal synthesis unit;
   a signal equalization unit connected to the feedback unit, configured to equalize the branch of signals and to transmit the branch of signals to an error decision unit; and
   the error decision unit connected to at least one of the feedback unit and the signal equalization unit, and configured to perform an error decision.

2. The multi-channel signal processing system according to claim 1, wherein the filter comprises:
   a convolution unit, configured to convolute the crosstalk source components with the filter weight coefficients, the crosstalk source components including transmission signals other than the branch of signals over the same transmission path as the branch of signals.

3. A multi-channel signal processing method, comprising:
   filtering at a signal transmitting end at least crosstalk source components corresponding to a branch of signals to be transmitted by utilizing a filter having filter weight coefficients;
   synthesizing the branch of signals and the filtered crosstalk source components, and transmitting the synthesized signals to a signal receiving end;
   obtaining an error component of the branch of signals from the signal receiving end; and
   updating the filter weight coefficients in accordance with the error component; and
   filtering at least the crosstalk source components with the filter weight coefficients updated according to a feedback of the branch of signals for reducing a signal error at the receiving end; wherein the feedback signal is generated when the signal receiving end receives the signals corresponding to the branch of signals.

4. The multi-channel signal processing method according to claim 3, wherein the step of filtering at least crosstalk source components corresponding to the branch of signals to be transmitted comprises:
   convoluting at least the crosstalk source components with the corresponding filter weight coefficients.

5. The multi-channel signal processing method according to claim 3, further comprising: equalizing the branch of signals before the feedback signal is generated, and
   terminating transmissions of the branch of signals when the feedback signal is being generated and transmitted.

6. The multi-channel signal processing method according to claim 3, further comprising: performing a general error decision process on the branch of signals before the feedback signal is generated.

7. The multi-channel signal processing method according to claim 3, wherein updating the filter weight coefficients further includes:
   conjugating the received signals in the frequency domain;
   performing an inverse Fourier transform on the conjugated signals for generating an error component; and
   updating the filter weight coefficients by performing iterative calculations in accordance with the error component.

8. The multi-channel signal processing method according to claim 3, further comprising: performing a delay process on the branch of signals before synthesizing the branch of signals and the filtered crosstalk source components.

9. The multi-channel signal processing method according to claim 3, wherein an Embedded Operations Channel (FOC) channel is used as a transmission channel for the feedback information.

10. The multi-channel signal processing method according to claim 3, wherein the crosstalk source components include downlink time-domain crosstalk source components, and the step of filtering the crosstalk source components comprises:
    filtering the downlink time-domain crosstalk source signals by utilizing the filter weight coefficients.

11. The multi-channel signal processing method according to claim 3, wherein the crosstalk source components include downlink frequency-domain crosstalk source components, and the step of filtering the crosstalk source signals comprises:
    filtering the downlink frequency-domain crosstalk source signals by utilizing the filter weight coefficients;
    windowing the synthesized signals generated by synthesizing the branch of signals and the filtered crosstalk source signals;
    performing an inverse Fourier transform on the windowed signals; and
    generating an error signal by performing a signal equalization process, a fast Fourier transform, and a delay decision feedback subtraction on the windowed signals;
    feeding back a sign of the error signal to the signal transmitting end; and
    updating the filter weight coefficients by the signal transmitting end in accordance with the sign of the signal error and an expected response after the synthesized signals are transmitted to the signal receiving end.

12. The multi-channel signal processing method according to claim 11, before synthesizing the branch of signals and the filtered crosstalk source components, filtering the branch of signals with a frequency-domain equalization, wherein the filter weight coefficients are updated when a signal link is added; and
    when the signal link is removed, if filtering with the frequency-domain equalization is not disabled, the filter weight coefficients are not updated, and if filtering with frequency-domain equalization is disabled, the filter weight coefficients are updated.

13. The multi-channel signal processing method according to claim 11, after synthesizing the branch of signals and the filtered crosstalk source signals, filtering the branch of signals with a frequency-domain equalization, wherein all the filter weight coefficients are updated when a signal link is added; and when the signal link is removed, if filtering with the frequency-domain equalization is not disabled, the filter weight coefficients are not updated, and if filtering with frequency-domain equalization is disabled, all the filter weight coefficients are updated.

14. A filter device, comprising:

a filter, configured to filter crosstalk source signals corresponding to a branch of signals to be transmitted by use of filter weight coefficients $w(n)$ and perform subsequent filtering in accordance with new filter weight coefficients $w(n+1)$, wherein the new filter weight coefficients $w(n+1)$ are calculated in accordance with received feedback information and the filter weight coefficients $w(n)$, and the feedback information comprising a signal error or a signal error sign;

a signal synthesis unit, configured to receive the branch of signals which are input and the crosstalk source signals filtered by the filter, and synthesize the branch of signals and the filtered crosstalk source signals;

a weight coefficient calculation unit, configured to calculate the new filter weight coefficients $w(n+1)$ by iterating the filter weight coefficients $w(n)$ in accordance with the signal error or the signal error sign in the feedback information and an expected response; and a convolution unit, configured to convolute the crosstalk source signals with the filter weight coefficients $w(n)$.

* * * * *

UNITED STATES PATENT AND TRADEMARK OFFICE
CERTIFICATE OF CORRECTION

PATENT NO. : 8,300,682 B2  Page 1 of 1
APPLICATION NO. : 12/479979
DATED : October 30, 2012
INVENTOR(S) : Liming Fang It is certified that error appears in the above-identified patent and that said Letters Patent is hereby corrected as shown below:

Column 18, line 30, "(FOC)" should read -- (EOC) --.

Signed and Sealed this
Nineteenth Day of March, 2013

Teresa Stanek Rea
*Acting Director of the United States Patent and Trademark Office*